United States Patent    [11] 3,624,246

| [72] | Inventors | Hendrik H. J. Deuzeman;<br>Norman Lumley, both of Watford, Ontario, Canada |
|---|---|---|
| [21] | Appl. No. | 8,752 |
| [22] | Filed | Feb. 4, 1970 |
| [45] | Patented | Nov. 30, 1971 |
| [73] | Assignee | Fiberglas Canada Limited<br>Toronto, Ontario, Canada |

[54] WATER-SOLUBLE OR WATER-DISPERSIBLE ALKYLATED AMINE COPOLYMERS
4 Claims, No Drawings

[52] U.S. Cl. .................................................. 260/21,
    117/126, 117/161 LN, 117/161 ZA, 260/32.6 N,
    260/33.6, 260/67.7
[51] Int. Cl. .......................................... C08g 37/30
[50] Field of Search ................................... 260/21,
    32.6 N

[56]              References Cited
                  UNITED STATES PATENTS

| 2,783,231 | 2/1957 | Albrecht et al. | 260/21 |
| 3,394,093 | 7/1968 | Salem | 260/21 |
| 3,487,048 | 12/1969 | Deuzeman | 260/67.6 |

Primary Examiner—Donald E. Czaja
Assistant Examiner—Ronald W. Griffin
Attorney—Stevens, Davis, Miller and Mosher ABSTRACT: A liquid thermosetting alkylated amine copolymer resin is produced by the reaction of melamine, urea, formaldehyde, and methanol in the presence of an alkanol amine and a fatty acid. The amine-acid residue in the resulting resin product acts as an emulsifier for mineral oil and other materials which may be mixed with the resin after production. The catalyst also acts as a surfactant when the resin-mineral oil emulsion is diluted with water for use as a binder in the production of glass fiber articles, and enhances the wet-out properties of the emulsion towards pigments.

WATER-SOLUBLE OR WATER-DISPERSIBLE ALKYLATED AMINE COPOLYMERS

This invention relates to a liquid thermosetting alkylated urea-melamine copolymer resin for use in preparation of a binder for fiber articles such as glass fiber batts.

Urea-melamine-formaldehyde resins are well known in the art and the binder systems formed therefrom usually comprise additionally high percentages of phenol resins. There exists a need for nitrogen containing thermosetting resin which is soluble or dispersible in water and in aqueous organic binder solvent mixtures and suitable for use in a binder which is formulated with little or no phenol constituent to act as a bonding material for glass fibers. The binder should have a relatively short curing time to adapt to modern manufacturing processes and be sufficiently stable after cure to resist deterioration of the end product under conditions of high moisture and high temperature. The use of the present invention enables reduction in the phenol content of the resulting binder from the usual 70:30 ratio of phenol resin to melamine resin down to a ratio of 55:45, or 30:70 or lower.

There is a large body of prior art relating to the production of melamine resins of the present type. The Salem U.S. Pat. No. 3,394,093, issued July 23, 1968 deals with the production of aminoplast resins, which resins are then mixed with a second resin which forms a catalyst for the production of the final cured resin binder material after its application to a fiber mat. In accordance with the Salem invention, a polyfunctional amine is reacted with formaldehyde and alcohol in a two-stage reaction to form a resin product. This product is then mixed with a soap formed by a nitrogenous base reacted with a carboxylic acid resin and the resulting mixture is employed in binder formulation.

The pending U.S. Pat. application Ser. No. 725,921 to Deuzeman, filed Apr. 30, 1968 now U.S. Pat. No. 3,487,048 and U.S. Pat. application Ser. No. 678,213 to Deuzeman and Lumley, filed Oct. 26, 1967 also relate to materials of this general type.

The use of a product of a reaction between an acid and a base as a soap in materials of this type is also well known. This is important for the purpose of improving the dispersion of the materials in water. In low concentrations, these materials tend to stick to equipment in which they are handled, and the presence of a suitable soap assists in keeping the equipment clean. Such a wetting agent or soap is also important in order to provide a good wet-out of pigments which may be mixed into the binder formulation.

However, the presence of excessive nonreacting or residual soap or wetting agent is undesirable as it will seriously increase the water absorption and reduce the water resistance of the final fiber product. It is also desirable to maintain a low degree of unsaturation in the system to minimize oxidation and the attendant discoloration in use.

It is an object of this invention therefore to provide a thermosetting amine copolymer resin suitable for aqueous dispersion for use as a binder in fibrous materials such as glass fiber batts.

The present invention therefore provides a process for preparing water-soluble or water-dispersible aminoplast resins comprising the steps of reacting together urea, melamine, formaldehyde and methanol in the presence of a small amount of water, an alkanol amine and a fatty acid.

In a preferred embodiment the present invention provides such a process for preparing water-soluble or water-dispersible aminoplast resins comprising the steps of reacting together urea, formaldehyde, and methanol in the presence of an alkanol amine and a trace of water at a slightly alkaline pH at an elevated temperature to form an intermediate resin condensate, adding a fatty acid and melamine to the intermediate resin and reacting further at a slightly acid pH and an elevated temperature, then bringing the product to a neutral or slightly alkaline pH.

The present invention further provides a water-soluble or water-dispersible aminoplast binder resin formed from the reaction of the urea, melamine, formaldehyde, methanol, alkanol amine and a fatty acid.

The alkanol amine will preferably be diethanol amine, triethanolamine or dimethylethanolamine.

Preferred embodiments of the fatty acids are lauric acid, coconut acids, Pamak–40 (trademark of Hercules Chemical Company), and Unitol A.C.D. fatty acid (trademark of Union Bag-Camp Paper Corporation). Pamak–40 is a tall oil fatty acid product which is high in rosin. Unitol A.C.D. fatty acid is a tall oil fatty acid mixture of low rosin content.

In carrying out the process of the present invention it was found convenient to employ as a source of formaldehyde and methanol a solution sold under the name "methyl FORMCEL" (trademark of Chemcell Co. Ltd.). This product comprises about 40 or 55 percent of formaldehyde in methanol by weight, along with a trace of water. However, other forms of these compounds may be used.

The formaldehyde should be present in at least 1.8 mol ratio based on urea. The final product should have from 1.8 to 2.3 mols of formaldehyde per mol of urea. More preferably, the product will have 2 to 2.2 moles of formaldehyde per mole of urea. In the preferred embodiment shown in the examples there is between 2.17 to 2.19 mols.

The methanol should be present in a ratio of at least 1.2 mols per mol of urea in the reaction charge. Preferably, it should be present in a ratio of from 1.2 to 2.6 mols per mol of urea.

The alkanol amine should be present in the reaction in a ratio of at least 0.005 mols per mol of urea. It should be present in sufficient quantities in the reaction charge to maintain the pH at the desired level. The alkanol amines will normally appear in the product in the ratio of 0.005 to 0.007 mols per mol of urea.

The maleic anhydride, which appears to function principally for pH control, will normally be employed in the ratio of 0.002 to 0.003 mols per mol of urea.

The fatty acid should be present in sufficient quantities to provide the necessary surfactant properties for the reaction and for the final product, as well as for pH control. This will normally be in the ratio of 0.002 to 0.003.

The melamine should be added to the reaction mixture in a ratio of 0.1 to 0.3 mols per mol of urea.

The alkanol amine and fatty acid should be present in sufficient quantities so that the resulting reaction product contains sufficient catalyst to impart the desirable surfactant and emulsifying properties to the resulting resin. Maleic anhydride may be used for pH control. Cooking temperatures may vary but will normally be in the range of 130° to 180° F. If excess alcohol is used in the reaction it may be removed by vacuum distillation and mild heating, along with unreacted formaldehyde.

The pH should be checked carefully and frequently especially during the first reaction under slightly alkaline conditions. The pH should be maintained slightly alkaline by the addition of further amine if necessary. Any suitable pH meter may be employed.

By carrying out the condensation reaction to form the urea-melamine resin in the presence of the fatty acid and alkanol amine, considerably improved properties are achieved in the final binder resin. It is not known for certain whether for alkanol amine and the fatty acid or their reaction product are joined to the urea-formaldehyde-methanol condensate by chemical bonds or by some other loose form of association. It is considered possible that there is in fact little or no interreaction but that the presence of the alkanol amine or the fatty acid change the nature of the condensation reaction to yield an improved resin, such as by driving the condensation reaction further in the direction of linear condensation, with less cross linking.

The resin which results from the reaction of the present invention will normally be stored as is and/or mixed with mineral oil to form an oil-in-resin emulsion. This emulsion may be stored or it may be dispersed in water to make the resulting binder, together with other materials as desired. The resulting heat curing thermosetting binders are used in industrial processes for the bonding of a large variety of fibrous products with particular reference to glass fiber batts.

Some examples of binder resins produced in accordance with the present invention are presented herewith.

EXAMPLE 1

| Ingredients | Gallons | Pounds |
|---|---|---|
| 40% methyl FORMCEL | 470 | — |
| diethanol amine | | 18 |
| urea (uncoated) | | 1,760 |
| lauric acid | | 17 |
| maleic anhydride | | 8 |
| melamine (recrystallized) | | (as needed) 400 |
| ammonia | 24 (as needed) | |

Cook Cycle

The methyl FORMCEL was added to a reactor. Half of the diethanol amine was added under agitation until homogeneous. The pH was around 6.5. The urea was then added, and the pH rose to about 7.7. The temperature was brought to 150° F. and the material was cooked to a free formaldehyde content of 10 to 11 percent (sulfite method). This took approximately 2½ hours. The mix was then cooled to 120°, and during the cooling period, lauric acid and maleic anhydride were added and dissolved over a period of 30 minutes. Then the melamine was added. The pH was adjusted to about 6.5 by addition of more maleic anhydride. The mix was then cooked to about 4 percent free formaldehyde at a temperature of 160° F. The mix was then cooled to 80° F., and the second half of the diethanol amine was added. The pH was adjusted to 7.3 to 7.5 with about 24 gallons of ammonium hydroxide after the mix was cooled. Then a full vacuum was applied and some heat was applied (up to about 120° F.) to expedite removal of excess alcohol. The finished product was found to be fully dispersible in water and compatible with other resins when used as a component in binder formulations.

EXAMPLE 2

A similar process was carried out with the following formulation:

| Ingredients | Pounds | |
|---|---|---|
| 55% methyl FORMCEL | 4,851 | (456 gals.) |
| diethanol amine | 24 | |
| urea | 2,475 | |
| lauric acid | 22.5 | |
| melamine | 564 | |
| maleic acid | 10.5 | |
| | 7,947.0 lbs. | |

Batch volume 685 gallons.
Ammonium hydroxide 25 gallons to pH 7.3 approximately.

Cook Cycle

The methyl FORMCEL was added to a reactor along with about half of the diethanol amine. The urea was then added and mixed thoroughly and the pH was adjusted to about 7.8 with diethanol amine. The temperature was raised to about 150° F., at which temperature the material was cooked for about 2½ hours, to a free formaldehyde content of 10. The mixture was then cooled and the lauric acid was added and dissolved. Then the melamine was added and the pH was adjusted to the slightly acid side with maleic acid as needed. The mixture was cooked at a slightly acid pH for 2½ hours at a temperature of 135° F. At the end of the cook, the mixture had a free formaldehyde content of about 3 percent. The mixture was cooled and the remainder of the diethanol amine was added. The pH was adjusted to 7.3 with ammonium hydroxide to yield the desired resin product which appeared to be a viscous solution of resin in the small amount of water formed in the condensation reaction. No appreciable excess alcohol was present in this reaction product as a result of the use of the 55 percent methyl FORMCEL. This resulting liquid resin was found to be very useful in binder formulations.

EXAMPLE 3

| Ingredients | Grams |
|---|---|
| methyl FORMCEL (55%) | 1,470 |
| triethanol amine | 7.2 |
| urea | 750 |
| Unitol A.C.D. fatty acid | 7.2 |
| Melamine | 171 |
| | 2,405.4 |

Cook Cycle

The methyl FORMCEL, urea and half of the triethanolamine was added to the reactor and cooked for 5 hours at 148° F. mean. The batch was then cooled and had a pH of 7.8 with a free formaldehyde content of 9.8 percent. The Unitol A.C.D fatty acid was then added to yield a pH of 6.6. The melamine was then added and the mix was cooked for 2½ hours at a temperature of 135° F. The mix then had a pH of 6.9 and free formaldehyde content of 2.8 percent. The mix was cooled and the remainder of the triethyl amine was added. The final binder resin had the following properties:

| | |
|---|---|
| pH | : 7.6 |
| Solids | : 61.0 |
| Surface tension | : 42.5 dynes/cm. |
| Dilutability | : infinite |
| Gel time (0.25% ammonium sulfate as catalyst) | : 250 sec. |

The material was found to be very useful in binder formulations for fibrous products.

EXAMPLE 4

| Ingredients | Grams |
|---|---|
| methyl FORMCEL (55%) | 1,617 |
| diethanol amine | 4 |
| urea | 825 |
| lauric acid | 7.5 |
| melamine | 188 |
| maleic acid | 3 |
| | 2,644.5 |

Cook Cycle

Methyl FORMCEL, urea and about half of the diethanolamine were added to the reactor and cooked at a pH of about 7.8 for 2 hours at 150° F. The batch was then cooled to 120° F. Lauric acid, melamine and maleic acid were added and the batch was cooked for 3 hours at 130° F. at a pH of about 6.4. The batch was cooled and neutralized to pH 7.5 with diethanolamine. The final binder resin had the following properties:

| | |
|---|---|
| Solids | : 62.8 |
| pH | : 7.5 |
| Surface tension | : 50 dynes/cm. |
| % free formaldehyde | : 2% |
| flow | : 1.75 inch |
| gel time | : 820 sec. |
| dilutability | : infinite. |

EXAMPLES 5 AND 6

The resin binders from the practice of the present invention were employed in binder formulations and were found to be very satisfactory, particularly in the formation of glass fiber articles. The formula of the solids portion of two such binder suspensions is shown herewith.

| Reagent | Example 5 | Example 6 |

| | | |
|---|---|---|
| Aminoplast resin | 100 lbs. | 70 lbs. |
| Phenolic resin | — | 30 lbs. |
| Mineral oil | 5.0 lbs. | 5 lbs. |
| Urea | — | — |
| Silicone | 0.1 lbs. | 0.1 lbs. |
| Ammonium sulfate | 0.25 lbs. | 0.25 lbs. |

We claim:

1. A process for preparing water-soluble or water-dispersible aminoplast resins comprising the steps of reacting together urea, formaldehyde, and methanol in the presence of an alkanol amine and a trace of water at a slightly alkaline pH at an elevated temperature to form an intermediate resin condensate, then adding a fatty acid and melamine to the intermediate resin and reacting further at a slightly acid pH and an elevated temperature, then bringing the product to a neutral of slightly alkaline pH.

2. A process as in claim 1 wherein the formaldehyde is present in at least 1.8 mol ratio, the methanol is present in at least 1.2 mol ratio, the alkanol amine is present in at least 0.005 mol ratio, the fatty acid is present in at least 0.002 mol ratio, and the melamine is present in at least 0.1 mol ratio, all based on mols per mol of urea.

3. A process as in claim 2 wherein the alkanol amine is diethanol amine, triethanol amine, or dimethylethanol amine, and the fatty acid is lauric acid, coconut acids, or tall oil fatty acids.

4. A water-soluble or water-dispersible aminoplast binder resin formed from the reaction of the urea, melamine, formaldehyde, methanol, alkanol amine and a fatty acid, whenever prepared by the process of claim 3.

* * * * *

UNITED STATES PATENT OFFICE
CERTIFICATE OF CORRECTION

Patent No. 3,624,246        Dated 11/30/71

Inventor(s) HENDRIK H. J. DEUZEMAN and Norman Lumley

It is certified that error appears in the above-identified patent and that said Letters Patent are hereby corrected as shown below:

Claim 1, last line before "slightly" delete "of" and replace it by --or--.

Signed and sealed this 13th day of June 1972.

(SEAL)
Attest:

EDWARD M. FLETCHER, JR.
Attesting Officer

ROBERT GOTTSCHALK
Commissioner of Patents